G. C. Love,
Potato Digger.
No. 111,656.   Patented Feb. 7, 1871.
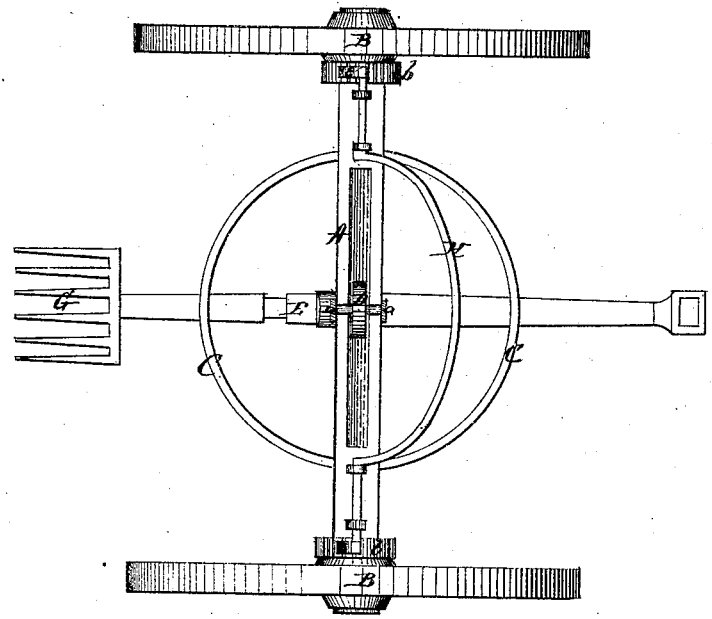
Witnesses
Inventor
George C. Love
per
Alexander Mason
attys.

United States Patent Office.

GEORGE C. LOVE, OF ENGLISH CENTRE, PENNSYLVANIA.

Letters Patent No. 111,656, dated February 7, 1871.

IMPROVEMENT IN POTATO-DIGGERS.

The Schedule referred to in these Letters Patent and making part of the same.

*To all whom it may concern:*

Be it known that I, GEORGE C. LOVE, of English Centre, in the county of Lycoming and in the State of Pennsylvania, have invented certain new and useful Improvements in Potato-Diggers; and do hereby declare that the following is a full, clear, and exact description thereof, reference being had to the accompanying drawing and to the letters of reference marked thereon making a part of this specification.

The nature of my invention consists in the construction and arrangement of a "potato-digger," as will be hereinafter fully set forth.

In order to enable others skilled in the art to which my invention appertains to make and use the same, I will now proceed to describe its construction and operation, referring to the annexed drawing, which represents a plan view of my machine.

A represents the axle, upon each end of which revolves a driving-wheel, B.

On the top of the axle A is secured a circle, C, which forms the handle of the machine.

The axle is grooved longitudinally for a certain distance on its upper side, and in this groove is placed a roller or wheel, D, the journals of which have their bearings in a bent bar, $a$, which passes under the axle, and is, by a clevis, attached to the handle E, having at one end the fork G.

Upon the inner end of the hub of each wheel B is a cog-wheel, $b$, in which work the catches $e\ e$, fastened on the ends of the wire bow H. This bow is pivoted on the upper side of the axle A, and the catches at its ends serve as brakes when needed.

Having thus fully described my invention,

What I claim as new, and desire to secure by Letters Patent, is—

1. The combination of the grooved axle A, wheel B B, circle C, roller D, bar $a$, and fork E G, constructed and operated substantially as shown and described.

2. In combination with the grooved axle A, wheels B B, circle C, fork E G, and roller $d$, the bail H, provided with the catches $e\ e$, operating in the cog-wheels $b\ b$, all substantially as set forth.

In testimony that I claim the foregoing I have hereunto set my hand this 19th day of May, 1870.

GEORGE C. LOVE.

Witnesses:
 E. E. CARSON,
 OLIVER CARSON.